INVENTORS
NOZOMU IWASAKI
WAYNE O. HADLAND

ATTORNEYS

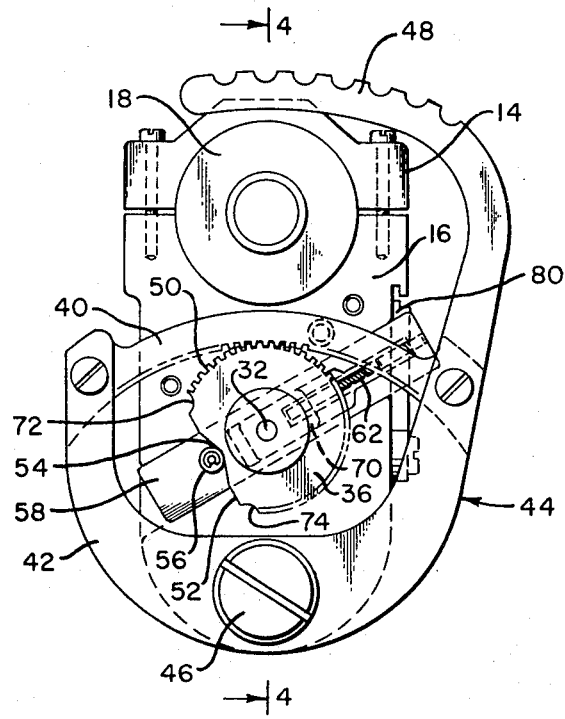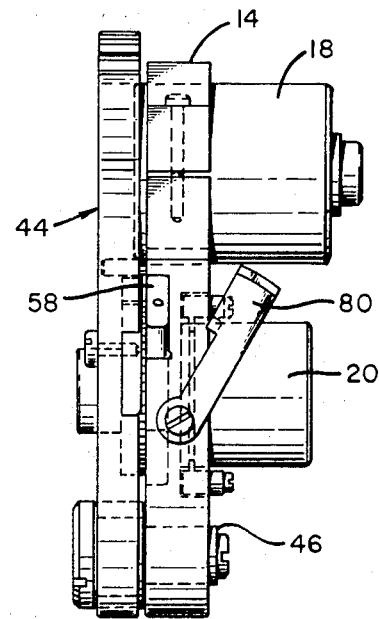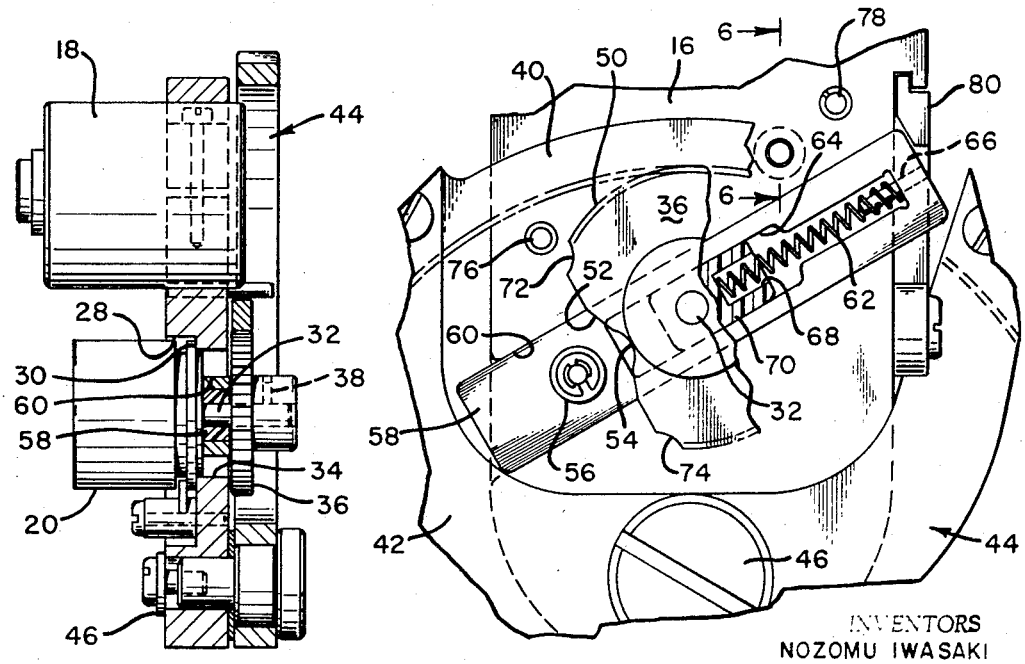

3,472,086
Patented Oct. 14, 1969

3,472,086
CONTROL DEVICE
Nozomu Iwasaki and Wayne O. Hadland, San Jose, Calif., assignors to the United States of America as represented by the Administrator of the National Aeronautics and Space Administration
Filed Nov. 28, 1967, Ser. No. 686,209
Int. Cl. F16j 15/50
U.S. Cl. 74—89.18                    8 Claims

ABSTRACT OF THE DISCLOSURE

A control device particularly adapted to be mounted on the steering wheel or other aircraft control mechanism for rotary operation of a potentiometer control having a protruding shaft. A potentiometer drive wheel is fixed to the shaft and has a gear sector along a major portion of its periphery with a cam sector along another portion. The gear sector is driven by an internal gear sector of larger diameter so that movement of the driving sector through a relatively small arc will produce movement of the drive wheel through an arc including its entire cam profile. A major recessed portion of the cam profile intermediate that arc defines the center position of the potentiometer and recesses at opposite ends of the cam profile may define the extreme positions. A cam follower is spring biased against the cam profile and the slope of the profile gradually increases toward the main depressed portion so that the turning torque is relatively constant as the biased cam follower moves radially inward. The spring which biases the follower slide and urged against the profile by a spring acting between the slide also acts against a bearing member on the potentiometer shaft in a direction to balance the spring force against the shaft asserted by the cam follower.

---

Figure 1:
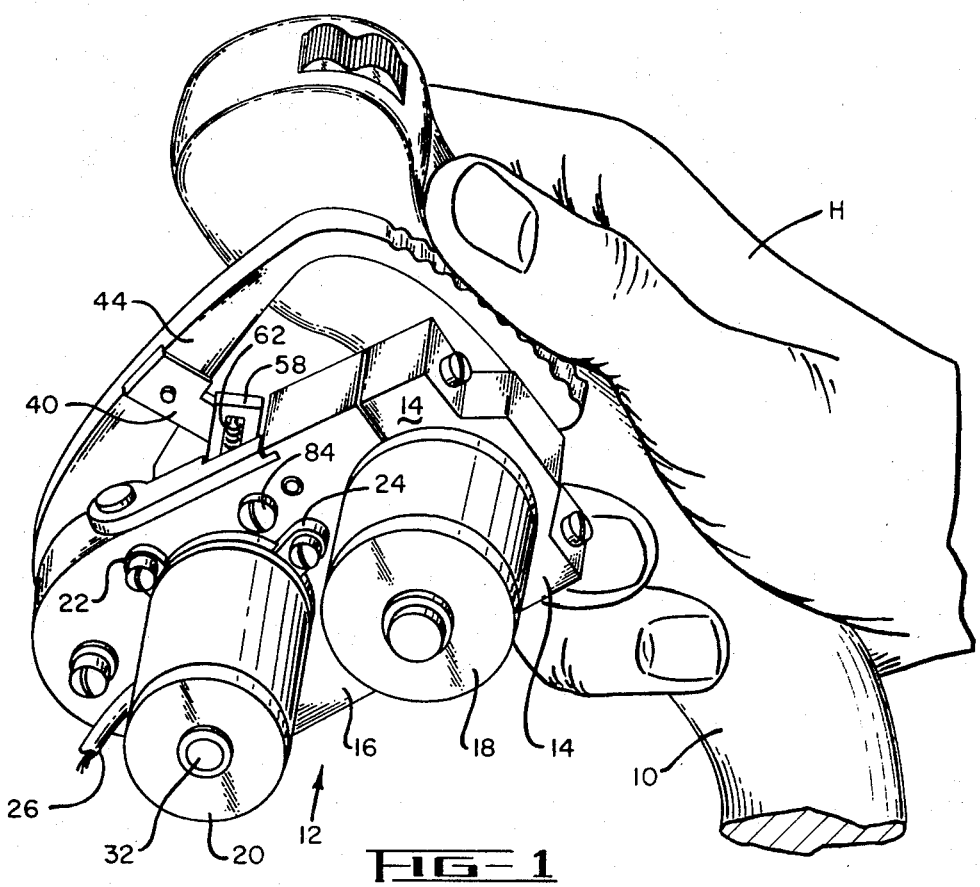

This invention relates to a control device and, more particularly, to a device for controlling a rotary potentiometer and particularly adapted to be mounted on aircraft steering wheel or aileron control whereby two-directional control may be conveniently achieved.

Previously, multiple axis control of aircraft required divided attention of the pilot and both pedal and manual operation. With the advent of high-speed aircraft and space vehicles, it is highly desirable that multiple axis maneuvers be achieved with a minimum amount of movement and with a minimum amount of visual attention to the controlling mechanisms. Others have proposed a control of aircraft in multiple axes by use of electrical signals from a potentiometer to an actuator for the control members of the aircraft. In such controls, the movement of the potentiometer from its zero or reference position is resisted by a cam follower biased against a shaped cam profile attached to the potentiometer shaft. However, the biasing force of the cam follower is transmitted to the potentiometer shaft and additional bearings are generally required to resist the thrust.

It is, therefore, an object of this invention to provide a control device for one axis of aircraft control which may be conveniently operated by the pilot without releasing the control device for another axis of flight.

It is a further object of this invention to provide a potentiometer control device, the zero position of which is determined by the cam follower acting against the cam surface without transmitting a radial load to the potentiometer shaft.

It is a further object of this invention to provide a potentiometer control device, which may be operated over its full range with just slight movement of the pilot's finger or thumb.

It is a further object of this invention to provide a device for an aircraft for control of one flight characteristic which may be operated by the same hand that operates another control device.

It is a further object of this invention to provide a potentiometer control device that may be moved to and from its zero position with fairly uniform torque.

In carrying out this invention, I provide a potentiometer mounted on a small housing or bracket with a driving wheel or disc secured to the shaft. A sector of the disc is provided with gear teeth and another sector is provided with a cam profile against which a cam follower acts. The cam follower is carried on a slide and is urged to engage with the cam profile by a biasing spring or the like which acts against a bearing member also carried on the shaft, the spring acting on the bearing member in a direction toward the cam profile so as to balance the force transmitted to the shaft by the cam follower itself. A large internal gear sector is pivotly mounted on the frame so that movement through a relatively small arc will produce rotation of the cam through its complete profile. The frame is adapted to be secured to some operating member of aircraft such as the steering wheel or control yoke and an arm secured to the internal gear sector extends immediately adjacent to the steering wheel so that it is within easy reach of the pilot's thumb.

Figure 6:
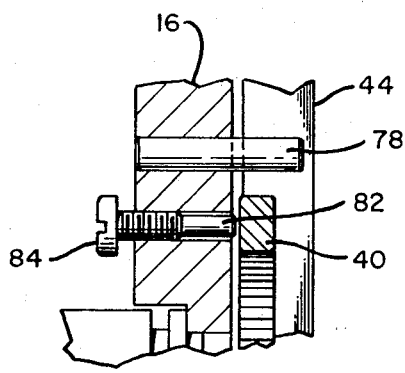

Other objects and advantages of this invention will become apparent from the description following when read in conjunction with the accompanying drawings wherein:

FIG. 1 is an isometric view of the control device as mounted for convenient operation;
FIG. 2 is a front elevation of the control device;
FIG. 3 is an elevation of the control device;
FIG. 4 is a section view taken along line 4—4 of FIG. 2;
FIG. 5 is an enlarged partial front elevation partly broken away; and
FIG. 6 is a section view taken along line 6—6 of of FIG. 5.

Referring now to FIG. 1, there is shown an aileron control yoke 10 to which is secured by potentiometer control device 12 in a location adjacent the hand H of the pilot. The control device 12 may be secured by means of a clamping head 14 provided on a mounting bracket 16 to clamp around any convenient protrusion such as a secondary control energizer 18. A rotary potentiometer 20 is secured to the mounting bracket 16 as by means of mounting clamps 22 held in place by suitable screws 24. Leads 26 from the potentiometer 20 extends to operate electrically a remote control device (not shown). As shown in FIG. 4 the potentiometer fits in a counterbore 28 with the clamps holding the inner end against the shoulder 30. The potentiometer shaft 32 extends through the counterbore 34 to the opposite side of the mounting bracket 16. A potentiometer driving wheel 36 is secured to the shaft by any suitable means such as a set screw 38 so that rotation of the driving wheel will produce rotation of the potentiometer shaft 32. This driving is accomplished by means of an internal gear sector 40 of relatively large radius, which is carried on an arm 42 of a U-shaped actuator 44 that is pivotly mounted to the bracket 16 at 46. The arm 42, 44 is pivoted by pressure applied to the rearward extension 48 having a roughened surface to facilitate thumb operation as shown in FIG. 1.

A sector of the driving wheel 36 is provided with gear teeth 50 to mesh with the driving sector 40 so that a relatively small angular movement of the arm will produce substantial rotation of the driving wheel, and, hence, the potentiometer shaft. It will be noted that with the bracket mounted on the aileron control yoke the rear-

3 wardly extending portion is immediately adjacent to the yoke so that the pilot may operate the potentiometer control 20 merely by a slight extension of this thumb. Hence, simultaneously with aileron control the pilot may, with slight thumb movement, operate the potentiometer to control some other flight characteristic.

In the embodiment illustrated a movement of the arm 42, 44 of 15 to 20 degrees in either direction from the neutral position shown in FIG. 2 will produce the full range of potentiometer control. With the dimensions contemplated this could very easily be accomplished by a thumb movement of no more than one half inch in either direction.

In the remaining sector of the drive wheel 36, there is formed a cam profile 52 including two cam faces which converge to a central or main depressed portion 54 which when engaged by the cam follower 56 marks the reference or zero position of the potentiometer. The cam follower 56 is rotatably carried on a slide member 58 which is slidably received in a slot 60 formed in the mounting bracket 16 and thereby restrained against lateral movement. The cam follower 58 is urged into engagement with the cam profile 52 by means of a compression spring 62 (FIG. 5) carried within a slot 64 on the slide and supported at one end on a pin 66 and at the other end in a socket 68 formed in a bearing block 70 of "Teflon" or the like freely rotatable on the shaft 32. Hence, when the spring 62 is compressed, a force is transmitted against the potentiometer shaft 32 in one direction through the gear-cam drive wheel 36, but this force is opposed by a like force applied directly by the spring 62 against the bearing block 70 in the opposite direction. Consequently, there is no appreciable net spring force acting against the shaft and it is, therefore, normally unnecessary to provide additional bearings on the mounting bracket 16.

If desired, additional recesses or cups 72 and 74 may be provided at the termini of the diverging cam profile portions 52 to indicate the extreme potentiometer conditions, but such conditions may likewise be determined just simply by a stop pin 76 which engages one internal sector support arm 42 in one direction of movement and a second stop pin 78 which engages the other arm 44 in the opposite direction of movement. Preferably, the cam profile 52 is formed so that it is of gradually increasing slope toward the central, zero position depression 54 in order to provide fairly uniform torque throughout rotation of the driving gear-cam 36. That is, as the force of the spring increases with increasing distortion, and as the radial distance or movement arm likewise increases the slope reduces so that the radial force of the spring will produce a correspondingly reducing tangential force against the driving wheel.

Also pivotly carried on the mounting bracket 16 is a latching member 80 which may be swung from the inactive position shown in FIGS. 2 and 3 to the active position of FIG. 5 wherein the cam follower slide 58 is retracted and the latch engages the end of the slide to retain it in inactive position for free movement of the wheel 36 and potentiometer shaft 32. In such conditions, a retarder plug of nylon or the like 82 (FIG. 6) may be urged into frictional engagement with the internal sector gear 40 as by tightening the pressure screw 84, in order to retard rotation of the gear sector 40 for closer manual control.

While this invention has been described in conjunction with a preferred embodiment thereof it is obvious that modifications and changes therein may be made by those skilled in the art without departing from the scope of this invention as defined by the claims appended hereto.

Having described our invention, we claim:

1. A control device for a potentiometer having a case, a rotatable member and a shaft extending therefrom comprising:
a body rigidly supporting said case,
driving means including a drive wheel secured onto said shaft,
a cam profile around a portion of said rdive wheel,
said cam surface including a main depressed portion,
a slide member,
a cam follower for engaging said cam surface,
a bearing member freely carried on said shaft, and
resilient means biasing said slide member to urge said cam follower into engagement with said cam surface,
said resilient means also acting against said bearing member to force it against the side of said shaft opposite said cam surface,
said force on said cam surface and said force on said shaft being equal and opposite so that said shaft radial load is zero.

2. The control device defined by claim 1 wherein:
engagement of said cam follower in said main depressed portion defines the center position of said potentiometer, and including:
additional depressed portions angularly displaced on opposite sides of said main depressed portion defining extreme positions of said potentiometer.

3. The control device defined by claim 1 wherein:
said cam profile portion progressively increases in radial dimension and decreases in slope from said main depressed portion to terminal surfaces on both sides thereof.

4. The control device defined by claim 1 including: a normally inactive latch movably carried on said body,
said latch being movable to a latching position engaging said slide when said slide is retracted to hold said cam follower free of engagement with the depressed portion of said drive member to retain said cam follower inactive.

5. The control device defined by claim 4 including:
friction brake means operable in active position to retard rotation of said driving means, and
selectively operable means for moving said brake means into active position.

6. The control device defined by claim 1 wherein:
said driving means comprises
an external gear sector on said drive wheel, and
a pivotally mounted internal gear sector of a larger radius than said external gear sector meshing therewith so that rotation of said internal gear sector through a small arc produces rotation of said drive member through an arc large enough to span said cam profile.

7. The control device defined by claim 6 including:
a normally inactive latch movably carried on said body,
said latch being movable to a latching position engaging said slide when said slide is retracted to hold said cam follower free of engagement with the depressed portion of said drive member.

8. The control device defined by claim 7 including
friction brake means operable in active position to retard rotation of said internal gear sector.

References Cited

UNITED STATES PATENTS 2,284,179    5/1942    Thelin _____ 74—89.18
3,028,126    4/1962    Holleman _____ 244—83.91

FOREIGN PATENTS 936,979    2/1948    France.

FRED C. MATTERN, Jr., Primary Examiner

W. S. RATLIFF, Jr., Assistant Examiner

U.S. Cl. X.R.

244—83.91